(12) United States Patent
Melville et al.

(10) Patent No.: US 8,485,576 B2
(45) Date of Patent: Jul. 16, 2013

(54) ROBOTIC GRIPPER

(75) Inventors: Robert Melville, New Providence, NJ (US); Andrew Stillinger, Chatham, NJ (US)

(73) Assignee: Douglas Holtz, Riverdale, NY (US), part interest ( * ) Notice: Subject to any disclaimer, the term of this patent is extended or adjusted under 35 U.S.C. 154(b) by 1353 days.

(21) Appl. No.: 12/144,335

(22) Filed: Jun. 23, 2008

(65) Prior Publication Data

US 2009/0314112 A1 Dec. 24, 2009

(51) Int. Cl.
*B66C 1/42* (2006.01)
*F16H 27/00* (2006.01)

(52) U.S. Cl.
USPC .............. 294/86.4; 294/213; 901/37; 901/39

(58) Field of Classification Search
USPC 294/86.4, 213, 207, 902, 119.1, 192; 269/21, 269/26, 266, 267, 32, 33; 901/37, 39, 31
See application file for complete search history.

(56) References Cited

U.S. PATENT DOCUMENTS

| | | | | |
|---|---|---|---|---|
| 1,499,989 A | * | 7/1924 | Lehmann | 269/101 |
| 2,399,824 A | * | 5/1946 | Pressman | 269/33 |
| 2,754,708 A | * | 7/1956 | Peterson | 269/224 |
| 2,882,771 A | * | 4/1959 | Blazek | 269/251 |
| 4,200,272 A | * | 4/1980 | Godding | 269/26 |
| 4,572,564 A | * | 2/1986 | Cipolla | 294/207 |
| 4,609,220 A | * | 9/1986 | Scott | 294/87.1 |
| 4,631,815 A | * | 12/1986 | Bocchicchio et al. | 294/185 |
| 4,770,455 A | * | 9/1988 | Collins, Jr. | 294/213 |
| 4,896,914 A | * | 1/1990 | Stevens | 294/207 |
| 5,011,207 A | * | 4/1991 | Stevens | 294/207 |
| 5,407,185 A | * | 4/1995 | Zehnpfennig et al. | 269/266 |
| 5,981,293 A | * | 11/1999 | Charlton | 436/177 |
| 5,988,618 A | * | 11/1999 | Meintrup et al. | 269/266 |
| 6,138,534 A | * | 10/2000 | Cho | 81/185 |
| 6,953,188 B2 | * | 10/2005 | Siegel | 269/266 |
| 2007/0236029 A1 | * | 10/2007 | Piccininni | 294/87.1 |

OTHER PUBLICATIONS

"Gator Grip;" http://www.endeavorproducts.com/Gator_Grip/page/Gator_Grip.html; retrieved Dec. 13, 2011.

* cited by examiner

*Primary Examiner* — Paul T Chin
(74) *Attorney, Agent, or Firm* — Holtz, Holtz, Goodman & Chick, P.C.

(57) ABSTRACT

A robotic gripping apparatus includes one or more constraining plates each having a plurality of holes formed therethrough and a plurality of elongate members. The elongate members are independently movable relative to one another. Each elongate member extends through a respective hole or set of aligning holes in the constraining plate(s). A distal end portion of one or more of the elongate members is capable of exerting a force for drawing an object against the distal end portion to thereby hold or grip the object.

19 Claims, 11 Drawing Sheets

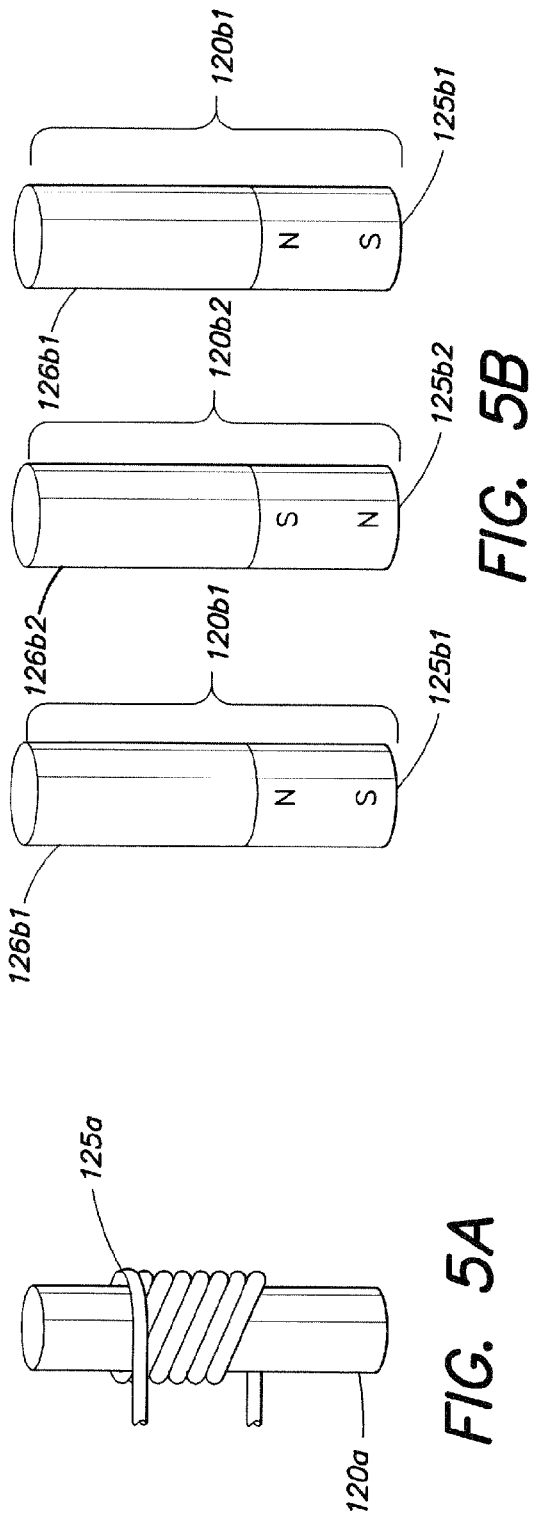

ROBOTIC GRIPPER

FIELD OF THE INVENTION

The present invention relates to a robotic gripping apparatus.

BACKGROUND OF THE INVENTION

Industrial robots often employ an articulated mobile structure, commonly referred to as an arm, with mobility approximating that of a human arm. Such a robotic arm is equipped with a so-called end effector to enable the robot to perform its assigned task.

In some applications, the end-effector performs a grasping or gripping function. One class of gripping end-effectors uses a set of individual prehensile mechanical fingers (typically two or more) which curl around an object, tightening around it in order to grip the object. This action closely mimics the grasping action of the human hand.

A mechanically simpler gripping action can be obtained by employing an attractive force, such as a magnetic or electric field or fluid suction. The gripper is placed against the object to be grasped and the attractive force is energized (e.g., the magnetic field or suction force is turned on). The object is then grasped for subsequent manipulation. When the robot is finished with the object, the attractive force is turned off, and the object is released.

However, some objects to be grasped are bulky and/or offer no obvious flat space against which to exert an attractive force. Examples include paint brushes and many surgical instruments. If, for example, a conventional electromagnet is used to grip a metal surgical instrument, the pole piece of the electromagnet may rest against a high spot or sharp surface or other irregular surface on the instrument. When the electromagnetic field is energized, the resulting grip may be less than satisfactory and the object may dangle, twist, or even be dropped.

SUMMARY OF THE INVENTION

In order to solve the problem of gripping objects that are not well-suited to being held using an attractive force, an improved gripping end-effector is proposed which is able to achieve a significantly more secure grip on bulky or oddly or irregularly shaped objects using an attractive force supplied at the end of each of a plurality of elongate members.

According to the present invention, a robotic gripping apparatus is provided which comprises a plurality of elongate members which independently adjust to the shape of an object to be gripped and are each capable of exerting an attractive force on the object.

BRIEF DESCRIPTION OF THE DRAWINGS

The invention, together with further objects and advantages thereof, may best be understood by reference to the following description taken in conjunction with the accompanying drawings, wherein like reference numerals identify like elements, and wherein:

FIG. 5A shows an electromagnetic pin usable in the present invention.

FIG. 5B shows several permanent magnet pins usable in the present invention.

FIG. 5C shows a fluid suction pin usable in the present invention.

FIG. 5D shows a van der Waals force pin usable in the present invention.

DETAILED DESCRIPTION

Figure 1:
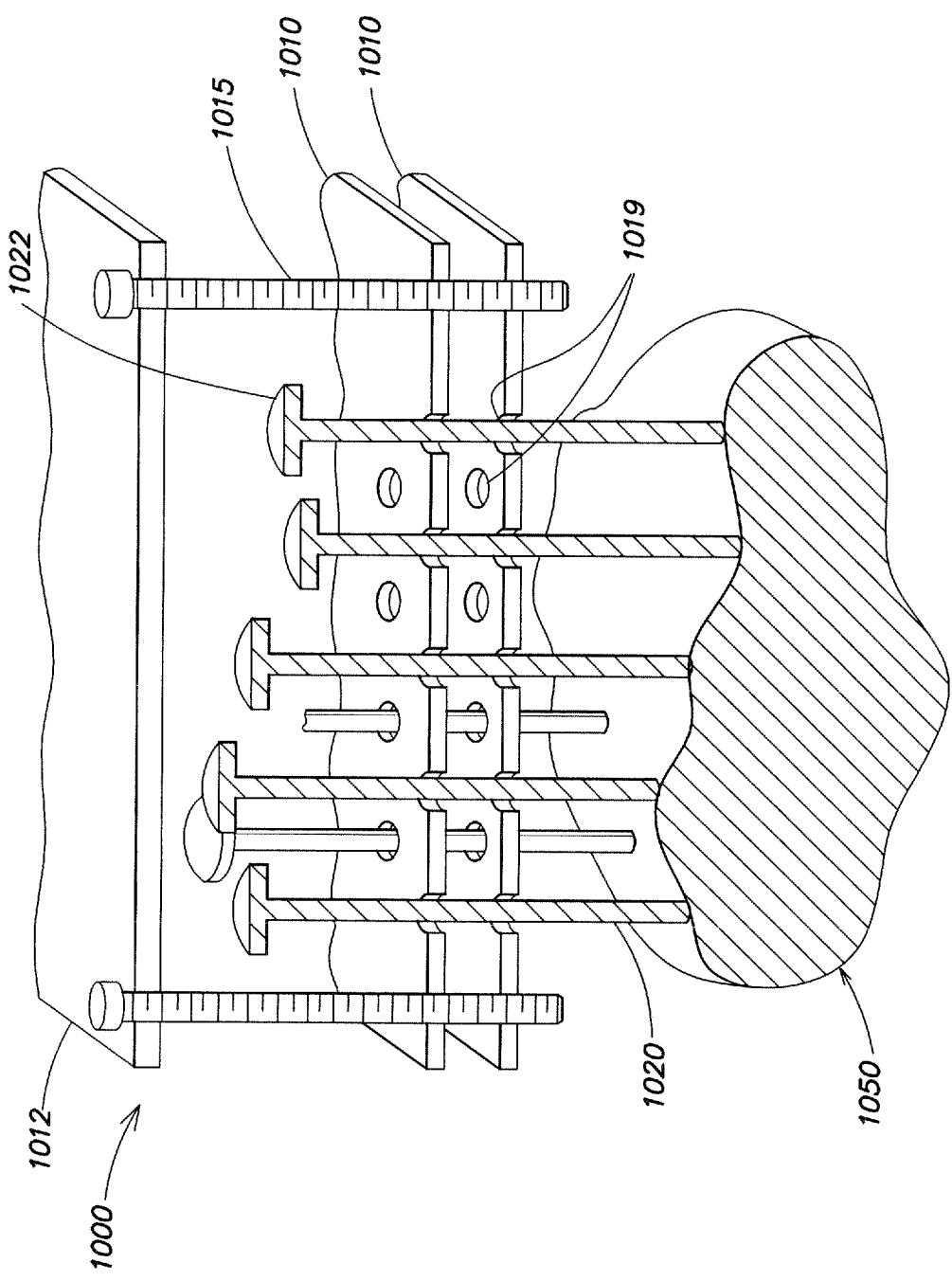
FIG. 1 shows a perspective cross section of a basic structure of a prior art pin and plate structure interacting with an object.

The elongate members of the present invention may be better understood by comparison with the action of a known children's toy called a PINPRESSIONS® 1000, a representation thereof being shown in FIG. 1. This known device comprises an array of several hundred metal pins 1020 oriented vertically and parallel to each other. (For clarity of understanding, only a few of the pins 1020 are shown.) The pins 1020 are constrained to move parallel to each other by two parallel plates 1010, both of which are perpendicular to the plurality of pins. The plates 1010 are spaced about one inch apart with each plate 1010 having matching sets of holes 1019 of slightly larger diameter than the pins 1020. The fit between the pins 1020 and the holes 1019 allows the pins 1020 to slide freely in a direction perpendicular to the plates 1010. A collar 1022 at the top of each pin 1020 prevents the pins 1020 from falling out of the toy 1000 in one direction, while a cover plate 1012 fastened to the two parallel plates 1010 by fastening structures 1015 prevents the pins from falling out of the toy 1000 in the opposite direction. In use, the toy 1000 is placed down onto an object 1050 and the pins 1020 adjust themselves in the vertical direction under the force of gravity to produce a relief image of the object 1050.

Figure 2:
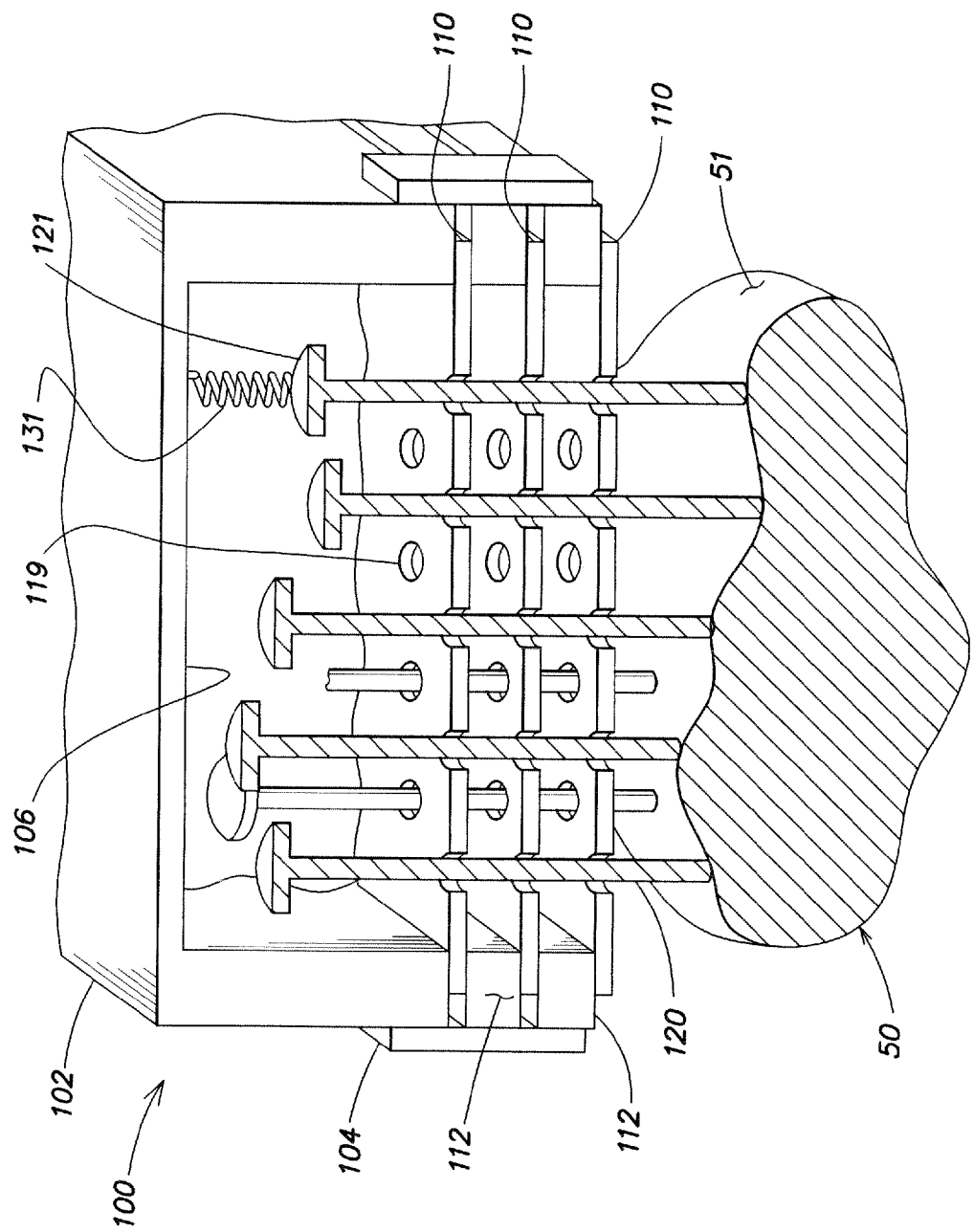
FIG. 2 shows a perspective cross section of an apparatus of the present invention and a pin locking mechanism of the present invention in an unlocked configuration.
Figure 3:
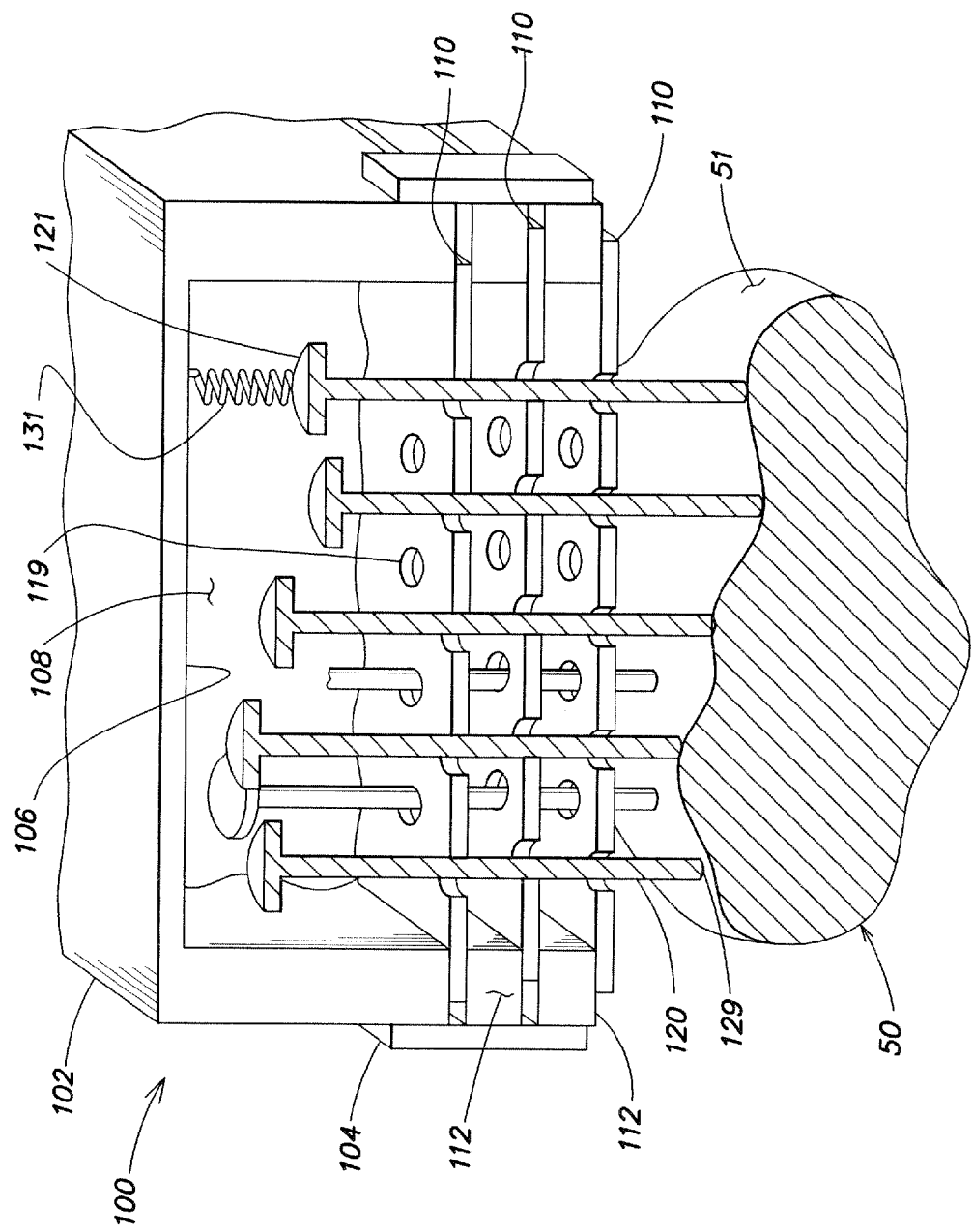
FIG. 3 shows a perspective cross section of an apparatus of the present invention and a pin locking mechanism of the present invention in a locked configuration.

According to the present invention, the end-effector 100 as shown in FIGS. 2 and 3 comprises a plurality of parallel, independently sliding or adjustable elongate members, hereinafter pins 120. (For clarity of understanding, only a few of the pins 120 are shown.) Each pin 120 is movable or adjustable in an axial direction independent of the movement or adjustment of the other pins 120 in the axial direction and each pin 120 is also individually capable of exerting an attractive force on an object 50. Various mechanisms to enable each pin 120 to exert such an attractive force may be applied, either the same mechanism for all pins in an end-effector 100 or different mechanisms for different pins in the end-effector 100. For example, each pin 120 might comprise an electromagnet 120a as in a first embodiment shown in FIG. 5A, a permanent magnet 120b1, 120b2 as in a second embodiment shown in FIG. 5B, a tube 120c through which a fluid pressure suction may be exerted as in a third embodiment shown in FIG. 5C, or a pad 120d with microscopic hairs 125d for increasing the surface area over which a van der Waals force acts as in a fourth embodiment shown in FIG. 5D.

In the embodiment shown in FIG. 5A, is provided by a wire 125a wound around the electromagnet 120a. In the embodiment shown in FIG. 5C, to enable exertion of the fluid pressure suction, a suction source 127c is coupled to an interior 125c of the tube 120c via a connecting conduit 126c.

In the embodiment shown in FIGS. 2 and 3, there are three constraining plates 110; however, a single plate would be practicable in combination with pins 120 equipped with permanently attractive ends and a release plate 111 or in combination with pins 120 equipped with an attractive force which could be turned off. A locking mechanism utilizing the relative position of two or more constraining plates 110 would not be practicable with a single constraining plate. The number of constraining plates may therefore vary in different embodiments of the invention.

The constraining plates 110 each have a plurality of holes 119 through which the pins 120 are freely slidable, when the constraining plates 110 are not in a locking position described below. The pins 120 are prevented from falling through the constraining plates 110 by a collar 121 on each pin that is larger than the corresponding hole 119 in each plate 110. Another form or construction may be provided, either in connection with the pins 120 and/or one or more of the constraining plates 110, to maintain the pins 120 in the holes 119 in the constraining plate 110.

The gripping process of the present invention comprises several operations.

Figure 6C:
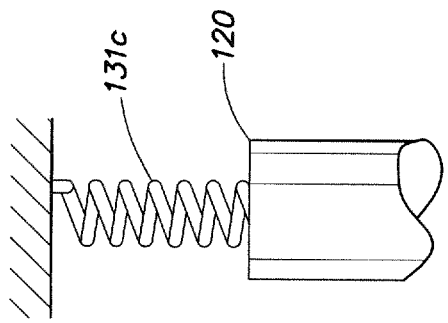
FIG. 6C shows a spring usable in the present invention for forcing a pin to a neutral position thereof.
Figure 6B:
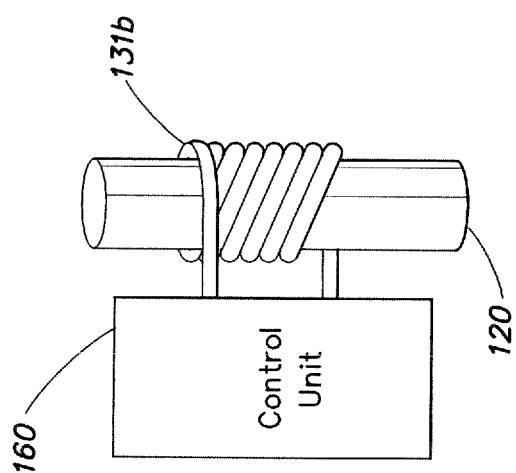
FIG. 6B shows a solenoid usable in the present invention for forcing a pin in either of two directions.
Figure 6A:
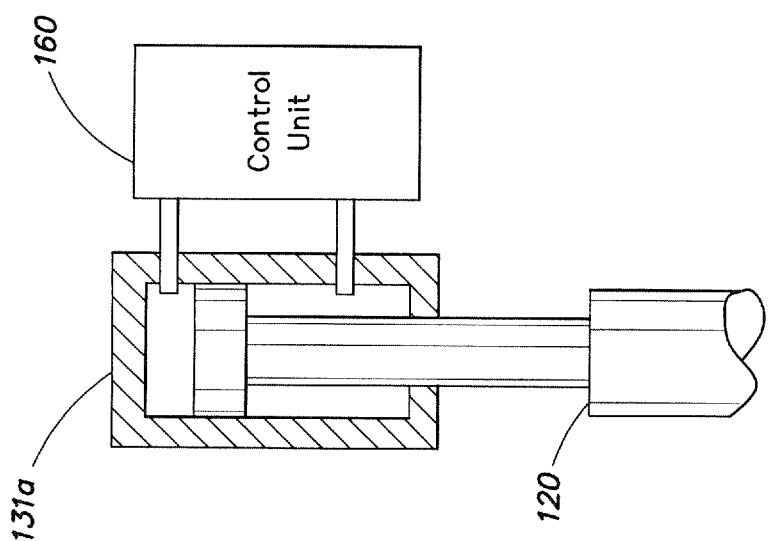
FIG. 6A shows a fluid piston usable in the present invention for forcing a pin in either of two directions.

First, conforming is performed, i.e., the end-effector 100 is conformed to the shape of the object 50. Specifically, the pins 120 are pressed against the surface 51 of object 50 and they slide relative to constraining plates 110 to conform to the shape of the object 50. Each pin 120 is equipped with a positioning member 131 (only one is shown for clarity of understanding) attached to an inside surface 106 of the main body 102. As shown in FIGS. 6A, 6B and 6C, the positioning member 131 may comprise at least one of a spring 131c, a solenoid 131b, or a fluid-actuated piston 131a for forcing each pin 120 in an outward normal direction of the constraining plates 110. When the pins 120 are forced into contact with the surface 51 of the object 50 to be gripped by the end-effector 100, the pins 120 conform to the shape of the object 50 because either the end-effector 100 is held stationary while the pins 120 are forced outwardly therefrom, or the object 50 is stationary while the end-effector 100 is moved closer to the object 50 or the object 50 is moved closer to the end-effector 100. The pins 120 are constrained to move parallel to each other, i.e., in an axial direction of each pin 120, by constraining plates 110. A control unit 160 modulates or controls a force applied by the solenoid 131b or the fluid piston 131a, when present, on the pins 120 according to the nature of the object 50.

Next, locking is performed. The pins 120 are locked in the positions obtained during the above-described conforming step by moving one or both of the constraining plates 110 relative to each other so that the pins 120 are locked in positions relative to the constraining plates 110. Locking can be accomplished by translation and/or rotation of the constraining plates 110 by plate translating/rotating devices 112. The plate translating/rotating devices 112 are attached to a main body 102 of the end-effector 100 by an attaching member 104. If the fit between each pin 120 and its corresponding hole 119 in each constraining plate is a close one, only a small displacement by rotation and/or translation of one of the constraining plates 110 is necessary to exert a sufficient shear force on some or all of the pins 120 to lock the pins 120 in position. The required force could be provided by an actuator such as, for example, a solenoid, a fluid driven piston or other linear or arc actuator. Such an actuator would be preferably controlled by a control unit 160 shown in FIG. 11 (described later).

If only a single constraining plate 110 is used, locking does not occur.

Each plate translating/rotating device 112 must be capable of slightly translating or rotating at least one of the constraining plates 110 to provide sufficient force to lock the pins 120 in position. Each plate translating/rotating device 112 may comprise, for example, any number of linear or angular electromagnetic or fluid actuators.

Figure 11:
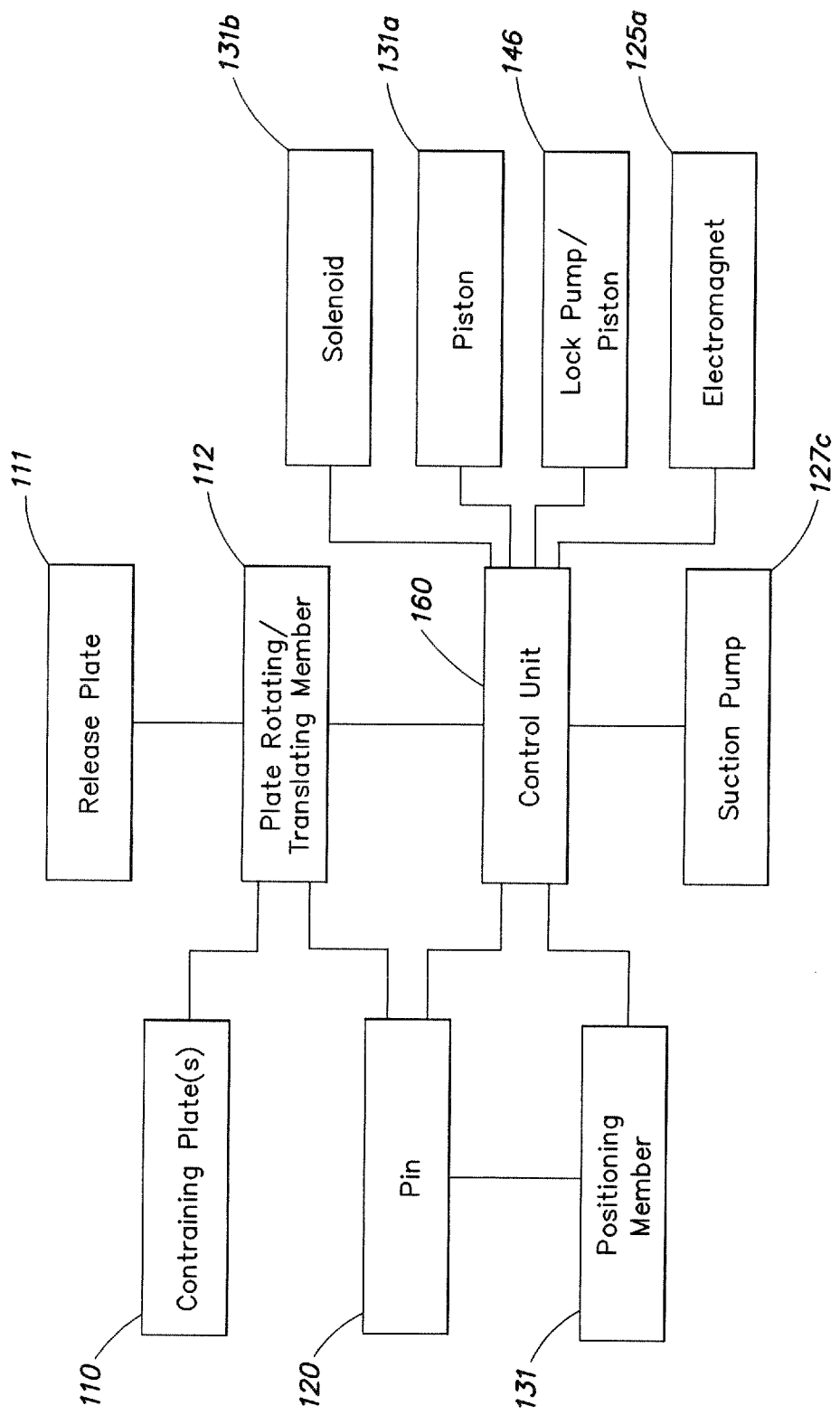
FIG. 11 shows a control unit usable with the present invention.

After the pins 120 are locked in position, the attractive force is activated, preferably by the control unit 160, in a gripping step (see FIG. 11). The object 50 can then be manipulated by the end-effector 100 during a manipulation step, and used for its intended purpose. Alternatively, the pins 120 can be locked in position after activating the attractive force.

Finally, the end-effector 100 may be operated to release the object 50 in a releasing step, e.g., after manipulation and/or use of the object 50. One method of releasing the object 50 is to simultaneously de-energize the attractive force and release the locking mechanism. Alternatively, the pins 120 can be unlocked before the attractive force is deactivated or vice versa. After the object 50 is released, each pin 120 is returned to a neutral position by the positioning member 131 to the position it had before beginning the conforming step.

Figure 7:
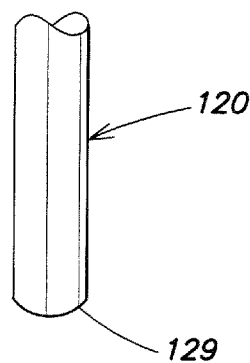
FIG. 7 shows a cross section of a rounded tip of a pin usable in the present invention.
Figure 8A:
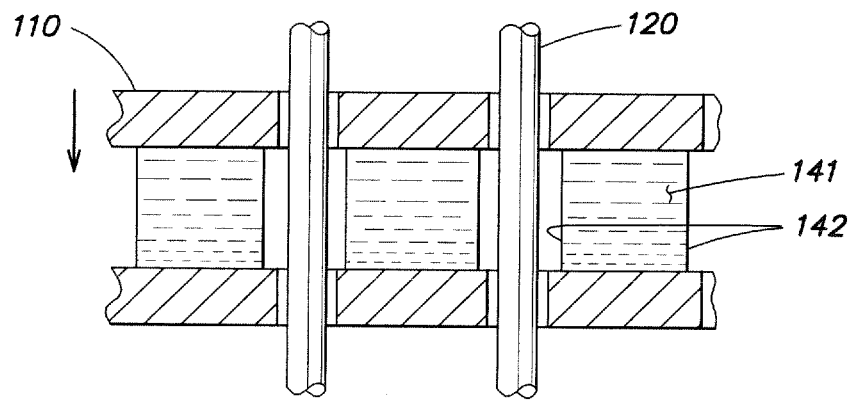
FIGS. 8A, 8B, 8C and 8D show cross sections of an alternative locking mechanism according to the present invention.
Figure 8B:
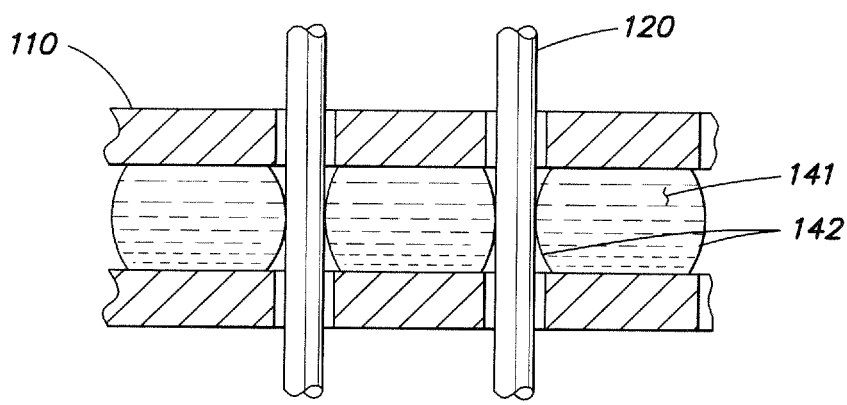
Figure 8C:
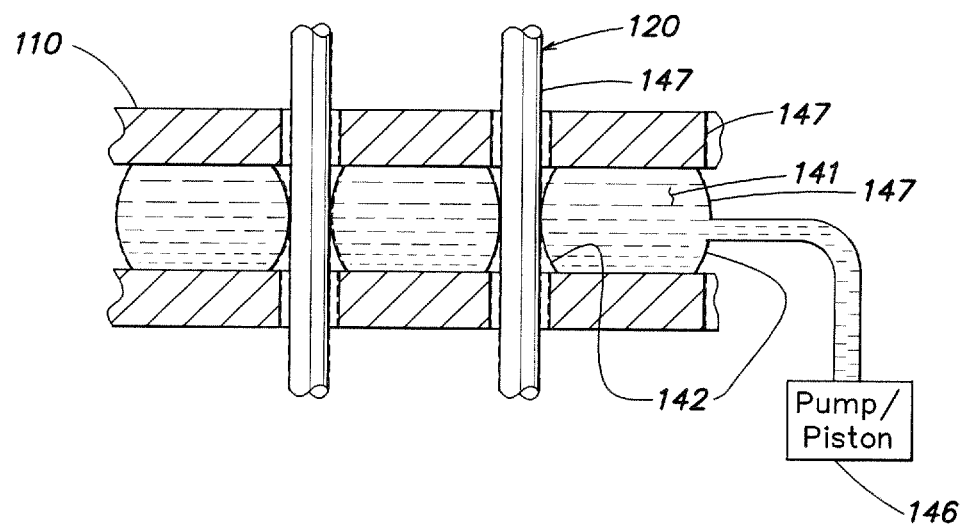
Figure 8D:
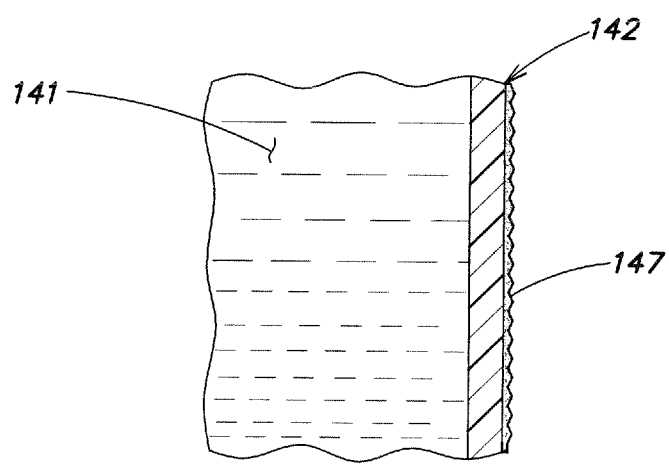

In some instances, it is advantageous to shape tips or ends 129 of the pins 120 with a shallow convex radius (see, for example, FIG. 7) or crown portion on the end rather than a flat end. This will enable the pins 120 to slide more easily over the surface of the object 50 (especially an irregularly shaped object 50) during conforming and release operations and will make them less prone to leaving scratch marks on the surface 51 of the object 50.

In the embodiments of the present invention which utilize a permanent attractive force, the attractive force is permanently active and is provided by, for example, permanent magnets 125b1 and 125b2 located at the end 129 of each pin 120. Conforming and locking are similar to those operations in the other embodiments, except that conforming occurs at the same time as gripping. Unlocking is also the same as in the other embodiments. Releasing the object 50 from pins 120 equipped with a permanently active attractive force requires retracting the ends 129 of the pins 120 into an interior 108 of the main body 102 of the gripper 100 or at least far enough apart from the object 50 so that the end 129 of enough of the pins 120 are prevented from being in contact with the object 50 so that the object 50 will not be held by the end-effector 100.

In the case of permanent magnet equipped pins (see FIG. 5B), the use of a holder 126b1 and 126b2 for a magnetic slug 125b1 and 125b2 is preferred because the slug itself may be difficult to machine. Each slug 125b1 and 125b2 has a North and South magnetic pole. The design as shown in FIG. 5B uses an array of slugs 125b1 and 125b2 with pole polarities alternating North and South. Such alternation of polarities is preferred because it results in little or no tendency to magnetize a metallic object after repeated grip and release cycles.

One configuration of the present invention, shown in FIG. 2 (see also FIG. 6C), uses compression springs 131c to drive the pins in an outward normal direction of the main body 102 of the end-effector 100. A collar 121 on an interior end of each pin 120 interacts with a constraining plate 110 that can be moved by the plate translating/rotating device 112 to force all of the pins 120 entirely inside the main body 102 of the end-effector 100 so as to disconnect the pins 120 from the surface 51 of the object 50.

Figure 4:
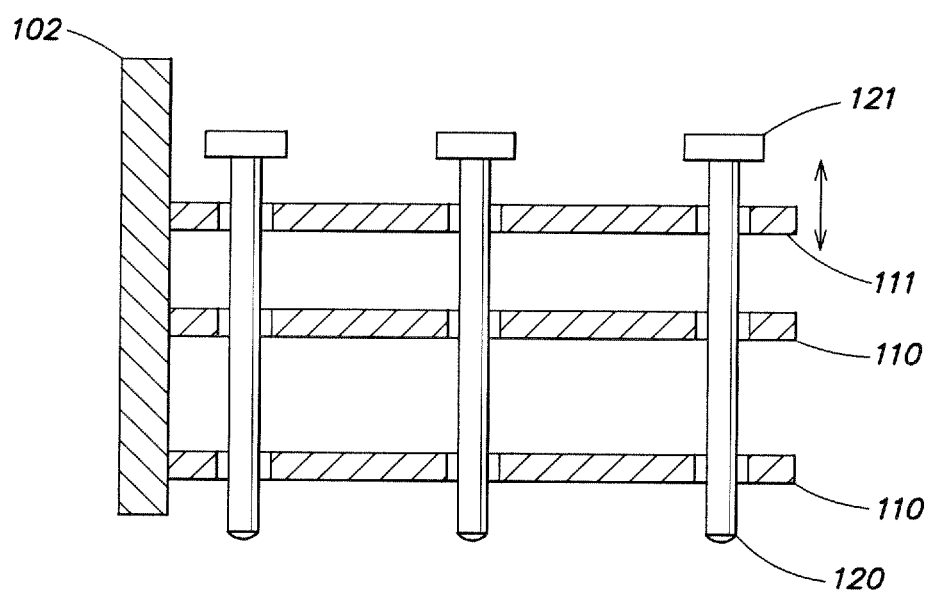
FIG. 4 shows a release mechanism of the present invention.

An alternate configuration uses the pin positioning member 131 to retract the pins 120. However, using a release plate 111 in combination with the pin collar 121 (see FIG. 4) to retract the pins 120 is preferable when the permanent attractive force being supplied is very large.

The gripping process of the permanent magnet equipped embodiments of the present invention is identical to the gripping process of other embodiments, except that the conforming and gripping steps occur at the same time. Locking of the pins should always follows conforming and gripping in permanent magnet equipped embodiments. Furthermore, release of the object 50 can only be adequately achieved by drawing the pins 120 entirely inside the main body 102 of the end-effector 100.

Figure 10:
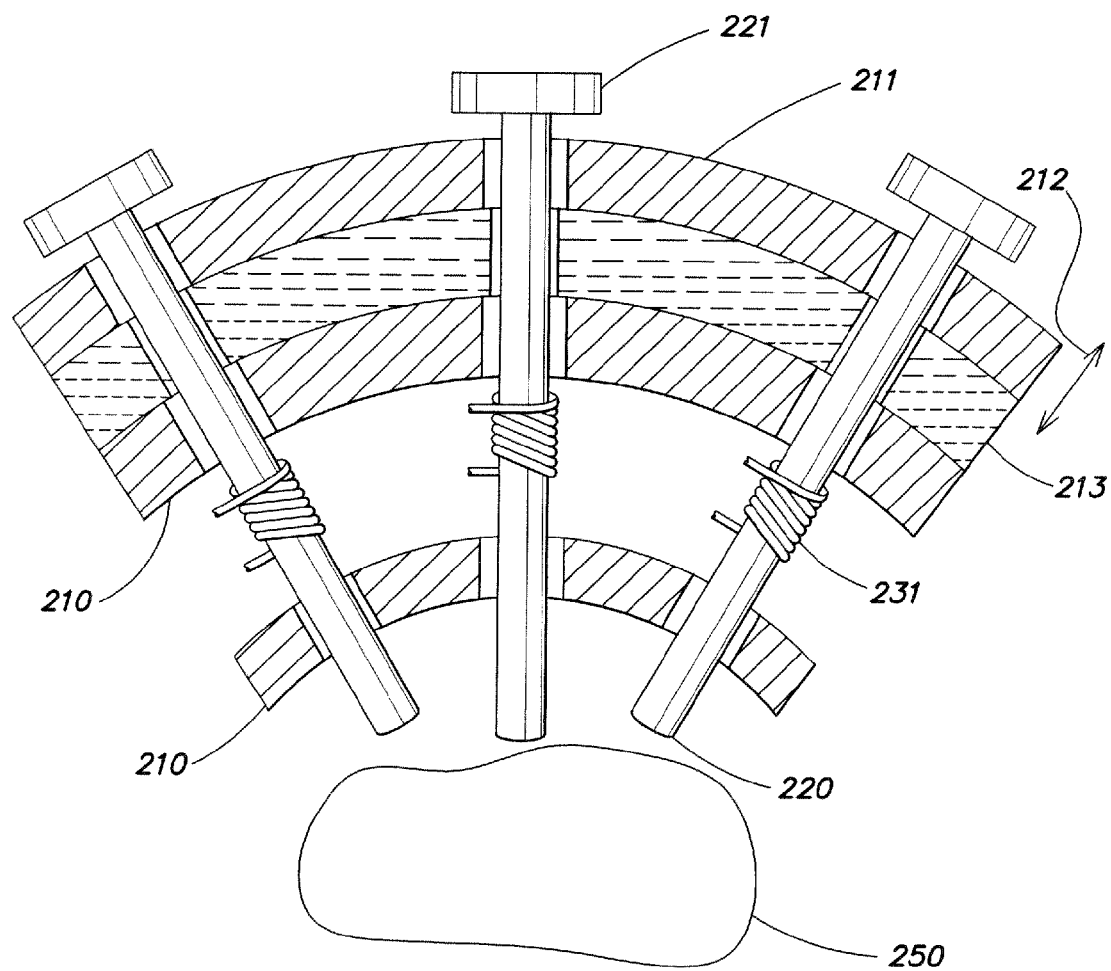
FIG. 10 shows a cross section of a curved structure of a gripper device according to the present invention.

FIG. 10 shows an alternate embodiment in which pins 220 are not parallel to each other and constraining plates 210 and 211 are curved. The pins 220 in this embodiment of the present invention are preferably locked by the locking mechanism shown in FIGS. 8A, 8B, 8C and 8D (described below), due to the curved shape of the constraining plates 210 and 211. This embodiment of the present invention is compatible with both permanent and temporary attractive forces. It is particularly suited to very oddly shaped objects 250 (FIG. 10) with specific holding requirements. As in the previously described embodiments, the pins 220 in this embodiment are equipped with both positioning members 231 and collars 221. A main body, control unit, and other parts of this embodiment are not shown in FIG. 10 for the sake of simplicity. All of the above-described pin and positioning mechanism designs are applicable to this embodiment.

As shown in FIGS. 8A, 8B, 8C and 8D, the pair of constraining plates 110 may be movable closer together to compress a fluid chamber 141 (or alternatively a foam) between the two constraining plates 110 to cause flexible walls 142 of the chamber 141 to come into contact with the pins 120. Alternatively, the fluid pressure in the chamber 141 may be increased by action of a pump or piston 146 connected to the chamber 141 which deforms the flexible walls 142 and cause them to come into contact with the sides of the pins 120. The pump or piston 146 or the motion of the constraining plates 110 is preferably controlled by the control unit 160. It is preferable that the flexible walls 142 be made of a high friction material such as rubber or coated with a high friction material 147. Only a few pins are shown and the main body and other parts are omitted from FIGS. 8A, 8B, 8C and 8D for the sake of clarity. The locking mechanism of FIGS. 8A, 8B, 8C, and 8D can be used with all embodiments of the present invention.

Figure 9A:
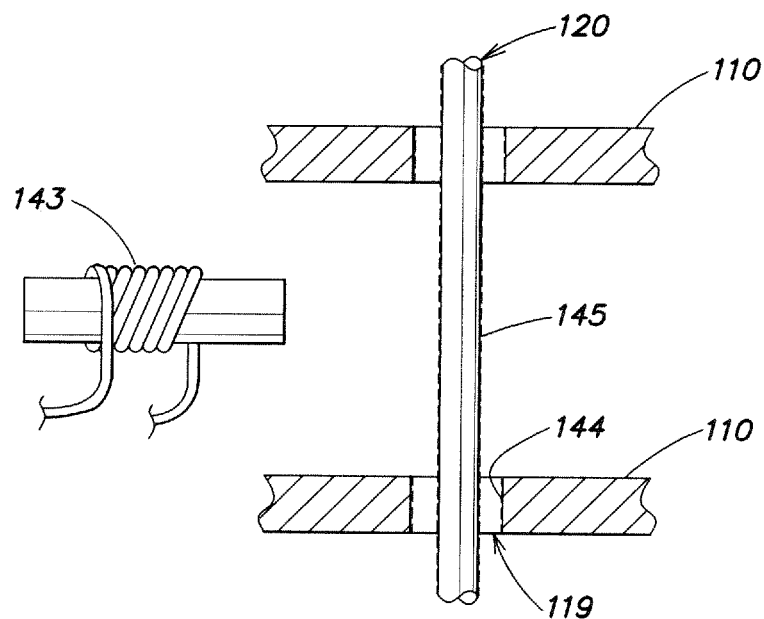
FIGS. 9A and 9B show cross sections of another alternative locking mechanism according to the present invention.
Figure 9B:
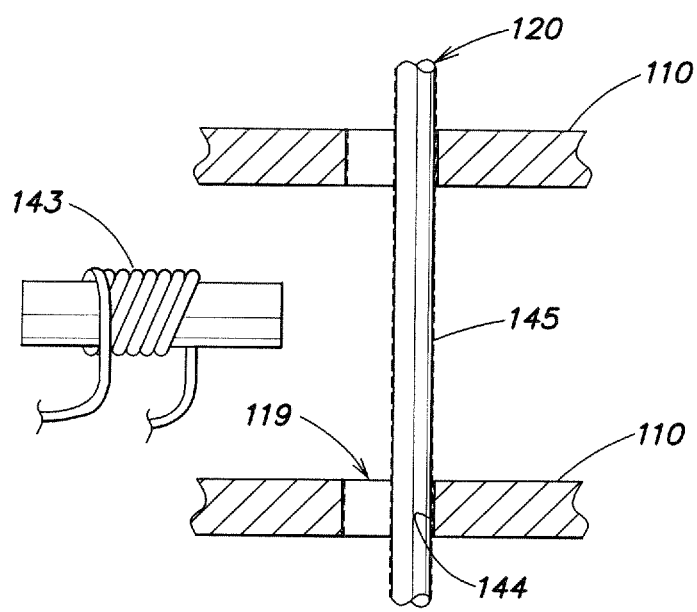

As shown in FIGS. 9A and 9B, an electromagnet 143 may be used to drive the pins 120 against an inside surface 144 of holes 119 in one of the constraining plate 110. In this embodiment, a single constraining plate may be used if it has sufficient thickness to maintain the pins 120 in positions substantially parallel to the inside surface 144 of the holes 119. In this case, it is preferable that the inside surface 144 of the hole and the side surface 145 of the pin 120 are either roughened or grooved to enhance the effectiveness of the locking force provided by the electromagnet 143. A fluid flowing parallel to and between the plates 110 may provide the locking force. Only a single pin is shown in FIGS. 9A and 9B and the main body, the other pins 120, and other parts are omitted from FIGS. 9A and 9B for the sake of clarity.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

The invention claimed is:

1. A robotic gripping apparatus, comprising:
at least two constraining plates arranged in parallel one on top of another with a space therebetween, each of the at least two constraining plates having a plurality of holes formed therethrough such that respective ones of the holes formed in each of the at least two constraining plates are aligned with each other; and
a plurality of elongate members, the elongate members being independently movable in an axial direction relative to one another, and each of said elongate members extending through respective ones of the holes formed in each of the at least two constraining plates;
wherein a distal end portion of at least one of the elongate members is configured to exert an attraction force on an object to be gripped so as to cause the object to be gripped to be temporarily held by the at least one of the elongate members; and
wherein the elongate members protrude from an outermost surface of an outermost constraining plate of the robotic gripping apparatus which opposes the object to be gripped.

2. The gripping apparatus of claim 1, wherein at least one of the at least two constraining plates is movable.

3. The gripping apparatus of claim 1, further comprising a deformable member interposed between the at least two constraining plates, wherein the at least two constraining plates are movable toward each other to deform the deformable member and thereby lock the position of the elongate members.

4. The gripping apparatus of claim 1, wherein at least one of the at least two constraining plates has a thickness sufficient to maintain the elongate members substantially perpendicular thereto.

5. The gripping apparatus of claim 1, further comprising means for moving the at least two constraining plates laterally relative to each other to selectively lock and unlock the elongate members.

6. The gripping apparatus of claim 1, further comprising a locking mechanism for locking the elongate members relative to the at least two constraining plates.

7. The gripping apparatus of claim 1, further comprising means for bringing the elongate members into contact with the at least two constraining plates.

8. The gripping apparatus of claim 1, further comprising a positioning member attached to each of the elongate members at a location other than the distal end portion.

9. The gripping apparatus of claim 8, wherein the positioning member comprises a spring.

10. The gripping apparatus of claim 8, wherein the positioning member comprises a piston.

11. The gripping apparatus of claim 8, wherein the positioning member comprises an electromagnetic actuator.

12. The gripping apparatus of claim 1, wherein the distal end portion of the at least one elongate member is arranged to exert a releasable attraction force on the object to be gripped.

13. The gripping apparatus of claim 1, further comprising permanent magnets arranged in connection with the distal end portion of the at least one elongate member to exert the attraction force on the object to be gripped.

14. The gripping apparatus of claim 1, further comprising a mechanism for generating a fluid pressure gradient at the distal end portion of the at least one elongate member to thereby exert the attraction force on the object to be gripped.

15. The gripping apparatus of claim 1, further comprising means for generating a magnetic field at the distal end portion of the at least one elongate member to thereby exert the attraction force on the object to be gripped.

16. The gripping apparatus of claim 1, wherein at least one of the at least two constraining plates is laterally movable to exert a shear force on the elongate members.

17. The gripping apparatus of claim 1, wherein each of the elongate members is retractable into an interior of the gripping apparatus such that the distal end portion thereof does not extend past the outermost surface of the outermost constraining plate.

18. The gripping apparatus of claim 1, wherein the at least two constraining plates are substantially planar, and the elongate members are substantially parallel to each other.

19. The gripping apparatus of claim 1, wherein the at least two constraining plates have a curved shape in section.

\* \* \* \* \*